United States Patent

Tezuka

(10) Patent No.: US 9,376,339 B2
(45) Date of Patent: Jun. 28, 2016

(54) OPTICAL GLASS, PREFORM FOR PRECISION PRESS MOLDING, AND OPTICAL ELEMENT

(71) Applicant: Sumita Optical Glass, Inc., Saitama, Saitama (JP)

(72) Inventor: Tatsuya Tezuka, Saitama (JP)

(73) Assignee: Sumita Optical Glass, Inc., Saitama, Saitama (JP)

(*) Notice: Subject to any disclaimer, the term of this patent is extended or adjusted under 35 U.S.C. 154(b) by 0 days.

(21) Appl. No.: 14/642,989

(22) Filed: Mar. 10, 2015

(65) Prior Publication Data
US 2015/0259242 A1    Sep. 17, 2015

(30) Foreign Application Priority Data

Mar. 14, 2014 (JP) .................. 2014-052108

(51) Int. Cl.
C03C 3/064 (2006.01)
C03C 3/091 (2006.01)
C03C 3/097 (2006.01)
C03C 3/068 (2006.01)
C03C 3/095 (2006.01)
C03C 3/093 (2006.01)

(52) U.S. Cl.
CPC .................. *C03C 3/097* (2013.01); *C03C 3/064* (2013.01); *C03C 3/068* (2013.01); *C03C 3/091* (2013.01); *C03C 3/093* (2013.01); *C03C 3/095* (2013.01)

(58) Field of Classification Search
CPC ........ C03C 3/064; C03C 6/066; C03C 3/068; C03C 3/091; C03C 3/093; C03C 3/095; C03C 3/097; C03C 4/20
See application file for complete search history.

(56) References Cited

U.S. PATENT DOCUMENTS

| 4,562,161 A * | 12/1985 | Mennemann ........... C03C 3/091 501/58 |
| 2007/0123411 A1* | 5/2007 | Mori ....................... C03C 3/066 501/73 |

FOREIGN PATENT DOCUMENTS

| JP | S6036348 A | 2/1985 | |
| JP | 05193979 A * | 8/1993 | ............. C03C 3/064 |
| JP | 2005200296 A | 7/2005 | |
| JP | 2005306627 A | 11/2005 | |
| JP | 2007169086 A | 7/2007 | |
| JP | 2007182381 A * | 7/2007 | ............. C03C 3/068 |
| JP | 2013018674 A | 1/2013 | |

OTHER PUBLICATIONS

Machine Translation of JP 2013-018674, Jan. 31, 2013.*
Sep. 16, 2015, Extended European Search Report issued by the European Patent Office in the corresponding European Patent Application No. 15158969.4.

* cited by examiner

*Primary Examiner* — Elizabeth A Bolden
(74) *Attorney, Agent, or Firm* — Kenja IP Law PC

(57) ABSTRACT

Provided is a medium-refractive-index low-dispersion optical glass that may be precision press-molded, that has a high water resistance, and that has a low specific gravity, as well as a preform for precision press molding and an optical element which use such an optical glass. The optical glass has a composition including, in % by mass, $SiO_2$: 35 to 55%, $B_2O_3$: 12 to 27%, $Al_2O_3$: 6 to 16%, $Li_2O$: 5 to 12%, MgO: 0 to 10%, CaO: 5 to 17%, $ZrO_2$: 0 to 7%, $La_2O_3$: 0 to 7%, ZnO: 0 to 5%, $TiO_2$: 0 to 5%, $Nb_2O_5$: 0 to 5%, and $Ta_2O_5$: 0 to 5%. SrO and BaO are not included.

6 Claims, No Drawings

OPTICAL GLASS, PREFORM FOR PRECISION PRESS MOLDING, AND OPTICAL ELEMENT

CROSS-REFERENCE TO RELATED APPLICATION

This application claims priority to and the benefit of Japanese Patent Application No. 2014-052108 filed on Mar. 14, 2014, the entire contents of which are incorporated herein by reference.

TECHNICAL FIELD

The present invention relates to an optical glass, a preform for precision press molding, and an optical element. In particular, the present invention relates to a medium-refractive-index low-dispersion optical glass that may be precision press-molded, that has a high water resistance, and that has a low specific gravity and also relates to a preform for precision press molding and an optical element which use such an optical glass.

BACKGROUND

In recent years, the popularity of and the development in optical devices have driven the need for optical glasses having a wide range of characteristics. Especially, a medium-refractive-index low-dispersion optical glass is in great demand because of its usability in a variety of optical devices such as digital cameras and video cameras. Furthermore, due to recent rapid advances in high performance products, there is an increasing demand for a glass suited for precision press molding by which a lens having a complicated shape may be manufactured relatively easily, a highly water-resistant glass that is capable of withstanding a severe use environment and easy to handle, and a glass having a low specific gravity from the perspectives of reducing weight and cost of such a product.

Examples of conventionally known medium-refractive-index low-dispersion optical glass that may be precision press-molded include the one containing $Al_2O_3$ in an amount of 4.8% by mass or less (refer to, e.g., Patent Literature 1), the one containing $Li_2O$ in an amount of 12.5% by weight or more (refer to, e.g., Patent Literature 2), the one containing CaO in an amount of 18% by weight or more (refer to, e.g., Patent Literature 3), the one containing SrO (refer to, e.g., Patent Literature 4), and the one containing BaO (refer to, e.g., Patent Literature 5).

However, the optical glasses described in Patent Literatures 1 to 5 have not been satisfactory yet as a medium-refractive-index low-dispersion optical glass that may be precision press-molded, in terms of water resistance and specific gravity.

CITATION LIST

Patent Literatures

PTL1: Japanese Patent Application Publication No. 2007-169086
PTL2: Japanese Patent Application Publication No. 2005-306627
PTL3: Japanese Patent Application Publication No. S60-036348
PTL4: Japanese Patent Application Publication No. 2005-200296
PTL5: Japanese Patent Application Publication No. 2013-018674

SUMMARY

The present invention has been conceived in view of the current state as described above, and an objective of the present invention is to provide a medium-refractive-index low-dispersion optical glass that may be precision press-molded, that has a high water resistance, and that has a low specific gravity and to provide a preform for precision press molding and an optical element which use such an optical glass.

The present inventor has conducted earnest studies about the reason why such an optical glass that has a satisfactory water resistance and a low specific gravity has not been obtained in Patent Literatures 1 to 5.

The studies have revealed the following findings.

(1) The present inventor has found that since the content of $Al_2O_3$ is as low as 4.8% by mass or less in any optical glass of Patent Literature 1, it is difficult to achieve a low specific gravity while maintaining a good water resistance. Accordingly, from the perspectives of water resistance and specific gravity, the content of $Al_2O_3$ has been found to be preferably greater than 4.8% by mass.

(2) The present inventor has found that since the content of $Li_2O$ is as high as 12.5% by weight or more in any optical glass of Patent Literature 2, the optical glass suffers from a decrease in the water resistance. Accordingly, from the perspective of water resistance, the content of $Li_2O$ has been found to be preferably less than 12.5% by weight.

(3) The present inventor has found that since the content of CaO is as high as 18% by weight or more in any optical glass of Patent Literature 3, the optical glass suffers from a decrease in the water resistance. Accordingly, from the perspective of water resistance, the content of CaO has been found to be preferably less than 18% by weight.

(4) The present inventor has found that since SrO is contained in any of the optical glasses of Patent Literature 4, it is difficult to achieve a low specific gravity. Accordingly, from the perspective of specific gravity, SrO has been found not to be included.

(5) The present inventor has found that since BaO is contained in any of the optical glasses of Patent Literature 5, it is difficult to achieve a low specific gravity. Accordingly, from the perspective of specific gravity, BaO has been found not to be included.

The present invention has been conceived through repeated studies to overcome the conventional problems based on the above findings. That is to say, the present invention is based on the novel finding that the desired objective will be achieved with at least a predetermined content of $Al_2O_3$, reduced contents of $Li_2O$ and CaO, and no content of SrO and BaO.

A first aspect of the present invention resides in
1. An optical glass having a composition including, in % by mass,
   $SiO_2$ in an amount of 35 to 55%,
   $B_2O_3$ in an amount of 12 to 27%,
   $Al_2O_3$ in an amount of 6 to 16%,
   $Li_2O$ in an amount of 5 to 12%,
   MgO in an amount of 0 to 10%,
   CaO in an amount of 5 to 17%,
   $ZrO_2$ in an amount of 0 to 7%,
   $La_2O_3$ in an amount of 0 to 7%,
   ZnO in an amount of 0 to 5%,
   $TiO_2$ in an amount of 0 to 5%, $Nb_2O_5$ in an amount of 0 to 5%, and
$Ta_2O_5$ in an amount of 0 to 5%, wherein
SrO and BaO are not included.

That "SrO and BaO are not included" means that SrO and BaO are not contained in the composition on purpose. That is to say, the composition includes substantially no content of SrO and BaO.

A second aspect of the present invention resides in
2. The optical glass of the item 1, having a specific gravity of less than 2.80.

A third aspect of the present invention resides in
3. The optical glass of item 1 or 2, having a chemical durability (water resistance) of Class 1 to Class 2 according to a powder method specified in the Japan Optical Glass Industrial Standards (JOGIS).

A fourth aspect of the present invention resides in
4. The optical glass of any one of items 1 to 3, having a refractive index (nd) of 1.57 to 1.61 and an Abbe number (vd) of 58 to 62.

A fifth aspect of the present invention resides in
5. The optical glass of any one of items 1 to 4, having a glass transformation temperature (Tg) of 545° C. or less and a yield point (At) of 590° C. or less.

A sixth aspect of the present invention resides in
6. A preform for precision press molding, including the optical glass of any one of items 1 to 5 as its material.

A seventh aspect of the present invention resides in
7. An optical element, including the optical glass of any one of items 1 to 5 as its material.

The present invention provides a medium-refractive-index low-dispersion optical glass that may be precision press-molded, that has a high water resistance, and that has a low specific gravity. The present invention also provides a preform for precision press molding and an optical element which use such an optical glass.

DETAILED DESCRIPTION (Optical Glass)

A preferred optical glass of the present invention will be described below in detail.

To start with, a description is given of the reason why the glass composition of the optical glass is limited to the aforementioned range. It should be noted that "%" expressions with respect to the components refer to % by mass unless otherwise specified.

<$SiO_2$>

$SiO_2$ is a useful component that is capable of forming a network structure of the glass and imparting the glass with producible devitrification-proof stability. $SiO_2$ also works to increase chemical durability. However, the content of $SiO_2$ of greater than 55% might decrease fusibility of the glass, and the content of $SiO_2$ of less than 35% might decrease the chemical durability (water resistance). Accordingly, the content of $SiO_2$ is set in the range of 35 to 55%. The content of $SiO_2$ is preferably in the range of 36 to 54%, and more preferably in the range of 37 to 53%.

<$B_2O_3$>

Similarly to $SiO_2$, $B_2O_3$ is a useful component that is capable of forming the network structure of the glass and imparting the glass with producible devitrification-proof stability. $B_2O_3$ also works to increase the refractive index (nd) without decreasing the Abbe number (vd) and to increase the fusibility. However, the content of $B_2O_3$ of greater than 27% might decrease the chemical durability (water resistance), and the content of $B_2O_3$ of less than 12% might decrease the fusibility and the refractive index (nd). Accordingly, the content of $B_2O_3$ is set in the range of 12 to 27%. The content of $B_2O_3$ is preferably in the range of 13 to 26%, and more preferably in the range of 14 to 25%.

<$Al_2O_3$>

$Al_2O_3$ works to form the network structure of the glass and also works, as a modifier oxide, to increase the devitrification-proof stability and the chemical durability (water resistance) of the glass. However, the content of $Al_2O_3$ of greater than 16% might decrease the fusibility, and the content of $Al_2O_3$ of less than 6% might decrease the chemical durability (water resistance). Accordingly, the content of $Al_2O_3$ is set in the range of 6 to 16%. The content of $Al_2O_3$ is preferably in the range of 7 to 15%, and more preferably in the range of 8 to 14%.

<$Li_2O$>

$Li_2O$ is a useful component that is capable of decreasing the glass transformation temperature (Tg) and the yield point (At) and also capable of decreasing the specific gravity. However, the content of $Li_2O$ of greater than 12% might decrease the chemical durability (water resistance), and the content of $Li_2O$ of less than 5% might increase the glass transformation temperature (Tg) and the yield point (At). Accordingly, the content of $Li_2O$ is set in the range of 5 to 12%. The content of $Li_2O$ is preferably in the range of 5.5 to 11.5%, and more preferably in the range of 6 to 11%.

<MgO>

MgO is a useful component that is capable of decreasing the specific gravity of the glass. However, the content of MgO of greater than 10% might decrease the refractive index (nd) and the chemical durability (water resistance). Accordingly, the content of MgO is set in the range of 0 to 10%. The content of MgO is preferably in the range of 0 to 9%, and more preferably in the range of 0 to 8%.

<CaO>

CaO is a useful component that is capable of increasing the refractive index (nd) without decreasing the Abbe number (vd) and also capable of increasing the fusibility. However, the content of CaO of greater than 17% might decrease the chemical durability (water resistance) and increase the specific gravity, and the content of CaO of less than 5% might decrease the refractive index (nd). Accordingly, the content of CaO is set in the range of 5 to 17%. The content of CaO is preferably in the range of 6 to 16%, and more preferably in the range of 7 to 15%.

<$ZrO_2$>

Even a small amount of $ZrO_2$ works to increase the chemical durability (water resistance) and the refractive index (nd). However, the content of $ZrO_2$ of greater than 7% might decrease the fusibility and the Abbe number (vd) and increase the specific gravity. Accordingly, the content of $ZrO_2$ is set in the range of 0 to 7%. The content of $ZrO_2$ is preferably in the range of 0 to 6%, and more preferably in the range of 0 to 5%.

<$La_2O_3$>

Even a small amount of $La_2O_3$ works to increase the chemical durability (water resistance) and also works to increase the refractive index (nd) without decreasing the Abbe number (vd). However, the content of $La_2O_3$ of greater than 7% might increase the specific gravity. Accordingly, the content of $La_2O_3$ is set in the range of 0 to 7%. The content of $La_2O_3$ is preferably in the range of 0 to 6%, and more preferably in the range of 0 to 5%.

<ZnO>

Even a small amount of ZnO works to increase the chemical durability (water resistance), the refractive index (nd), and the fusibility. However, the content of ZnO of greater than 5% might decrease the Abbe number (vd) and increase the specific gravity. Accordingly, the content of ZnO is set in the range of 0 to 5%. The content of ZnO is preferably in the range of 0 to 4%, and more preferably in the range of 0 to 3%.
<$TiO_2$>

Even a small amount of $TiO_2$ works to increase the chemical durability (water resistance) and the refractive index (nd). However, the content of $TiO_2$ of greater than 5% might significantly decrease the fusibility and the Abbe number (vd). Accordingly, the content of $TiO_2$ is set in the range of 0 to 5%. The content of $TiO_2$ is preferably in the range of 0 to 4%, and more preferably in the range of 0 to 3%.
<$Nb_2O_5$>

Even a small amount of $Nb_2O_5$ works to increase the chemical durability (water resistance) and the refractive index (nd). However, the content of $Nb_2O_5$ of greater than 5% might decrease the Abbe number (vd) and increase the specific gravity. Accordingly, the content of $Nb_2O_5$ is set in the range of 0 to 5%. The content of $Nb_2O_5$ is preferably in the range of 0 to 4%, and more preferably in the range of 0 to 3%.
<$Ta_2O_5$>

Even a small amount of $Ta_2O_5$ works to increase the chemical durability (water resistance) and the refractive index (nd). However, the content of $Ta_2O_5$ of greater than 5% might decrease the Abbe number (vd) and increase the specific gravity. Accordingly, the content of $Ta_2O_5$ is set in the range of 0 to 5%. The content of $Ta_2O_5$ is preferably in the range of 0 to 4%, and more preferably in the range of 0 to 3%.
<SrO, BaO>

As far as the optical glass of the present invention is concerned, SrO and BaO have been found to possibly increase the specific gravity. Therefore, SrO and BaO are not included in the optical glass of the present invention. That "SrO and BaO are not included" herein means that SrO and BaO are not contained in the composition on purpose. That is to say, the composition includes substantially no content of SrO and BaO.
<Specific Gravity>

In the optical glass of the present invention with the composition including the aforementioned components, from the perspectives of reducing the weight and cost of the product, the specific gravity is preferably less than 2.80, and more preferably 2.75 or less.
<Chemical Durability (Water Resistance)>

In the optical glass of the present invention with the composition including the aforementioned components, the chemical durability (water resistance) according to the powder method specified in the Japan Optical Glass Industrial Standards (JOGIS) is preferably ranked as Class 1 to Class 2.
<Refractive Index (nd), Abbe Number (vd)>

In the optical glass of the present invention with the composition including the aforementioned components, the refractive index (nd) is preferably in the range of 1.57 to 1.61 (medium refractive index), and more preferably in the range of 1.575 to 1.605 (medium refractive index).

Furthermore, in the optical glass of the present invention with the composition including the aforementioned components, the Abbe number (vd) is preferably in the range of 58 to 62, and more preferably in the range of 58.5 to 61.5.
<Glass transformation Temperature (Tg), Yield Point (At)>

In the optical glass of the present invention with the composition including the aforementioned components, from the perspective of precision press moldability, the glass transformation temperature (Tg) is preferably 545° C. or less, and more preferably 540° C. or less.

In the optical glass of the present invention with the composition including the aforementioned components, from the perspective of precision press moldability, the yield point (At) is preferably 590° C. or less, and more preferably 585° C. or less.

Such a medium-refractive-index low-dispersion optical glass having a refractive index (nd) of 1.57 to 1.61, an Abbe number (vd) of 58 to 62, a specific gravity of less than 2.80, a chemical durability (water resistance) ranked as Class 1 to Class 2 according to the powder method specified in the Japan Optical Glass Industrial Standards (JOGIS), a glass transformation temperature (Tg) of 545° C. or less, and a yield point (At) of 590° C. or less, as described above, has not been achieved until the present invention.
<Manufacturing Method of Optical Glass>

Next, a description is given of a manufacturing method of an optical glass of the present invention.

According to the present invention, the optical glass, which only needs to have the component composition satisfying the aforementioned preferable ranges, may be manufactured by any method without particular limitation, and any conventional manufacturing method may be used.

That is to say, as the materials of the components, the corresponding oxides, hydroxides, carbonates, phosphates, or the like are weighed at a predetermined ratio and fully mixed to prepare the mixed glass material. Subsequently, the prepared material is loaded into, for example, a platinum crucible which does not have reactivity with the glass material, and heated in an electric furnace to 1200 to 1500° C. to be melted while being stirred timely. After that, the molten product is refined and homogenized in the electric furnace, followed by casting into a mold that is preheated to an appropriate temperature. The resulting product is gradually cooled in the electric furnace to remove strain. Thus, the optical glass of the present invention is manufactured. Additionally, for the purpose of improving coloring and defoaming of the glass, a negligible amount (0.5% or less) of an industrially well-known defoaming component, such as $Sb_2O_3$, may be added.
(Preform for Precision Press Molding)

A preferred preform for precision press molding of the present invention will be described below in detail.

A preform for precision press molding (precision press-molding preform) refers to a preformed glass material that is used in a well-known precision press molding.

In the description below, such a precision press-molding preform may be referred to simply as a preform. Although the preform connotes a preformed glass body that is to be subjected to heating for precision press molding, the precision press molding herein is also called mold optics molding as is well-known. In this method, an optical-function surface of an optical element is formed by transferring a molding surface of a press mold to the glass. An optical-function surface refers to a surface of an optical element which refracts, reflects, diffracts, and transmits light to be controlled. For example, a lens surface of a lens corresponds to such an optical-function surface.

In order to allow the glass to satisfactorily extend along the molding surface of the press mold during the precise press molding while preventing reaction and fusion-bonding between the glass and the molding surface, the preform is preferably covered on its surface with a mold releasing film. Various types of mold releasing films may be used, and the examples include those containing noble metals (e.g., platinum and platinum-alloy), oxides (e.g., oxides of Si, Al, Zr, La, and Y), nitrides (e.g., nitrides of B, Si, and Al), and carbon. As a carbon-containing film, a film containing carbon as a primary component (i.e., a film whose content of carbon is greater than contents of other elements when the contents of the elements in the film are expressed in atomic %) is preferable. For example, a carbon film or a carbon-hydrogen film may be used. As a film formation method for a carbon-containing film, any known process, including a vacuum deposition process, a sputtering process, and an ion plating process with carbon material, or any known process, including a thermal decomposition process with material gas such as hydrocarbons may be used. For formation of films of the other types, a deposition process, a sputtering process, an ion plating process, a sol-gel process, or the like may be used.

Although a manufacturing method of the preform of the present invention is not particularly limited, the preform is preferably manufactured by the following method by taking advantage of the excellent characteristics of the glass.

A first method (hereinafter may be referred to as a preform manufacturing method I) of manufacturing the preform for precision press molding includes melting the glass material, flowing out the resulting molten glass to separate a molten glass gob from the molten glass flow, and molding the obtained molten glass gob during a cooling process. With these processes, the preform manufacturing method I molds the preform configured by using the aforementioned optical glass.

A second method (hereinafter may be referred to as a preform manufacturing method II) of manufacturing the preform includes melting the glass material, molding the resulting molten glass into a glass molded body, and processing the obtained glass molded body, thus manufacturing the preform configured by using the aforementioned optical glass of the present invention.

The preform manufacturing methods I and II commonly include the process of forming the homogenous molten glass from the glass material. For example, the glass material, which has been prepared by such mixing that provides desired characteristics, is loaded into a platinum melting vessel and is heated, melted, clarified, and homogenized to prepare the homogeneous molten glass. The prepared molten glass is flowed out from a flow nozzle or pipe which is made of platinum or platinum alloy at a regulated temperature. Alternatively, the glass material may be subjected to rough melting to obtain cullet, and the obtained cullet may be mixed, and then heated, melted, refined, and homogenized for obtaining the homogenous molten glass. In this case also, the prepared molten glass may be flowed out from the flow nozzle or pipe.

For molding a small preform or a spherical preform, a required mass of the molten glass is dripped from the flow nozzle as a molten glass drop. The drop of the molten glass is received by a preform mold with which the drop is molded into the preform. Alternatively, a drop of the molten glass, also in the required mass, may be dripped from the flow nozzle into, for example, liquid nitrogen with which the drop is molded into the preform. For manufacturing of a medium to large size preform, the molten glass flow is directed down through the flow pipe, and the head of the molten glass flow is received by the preform mold. Then, after a constricted portion is formed between the nozzle of the molten glass flow and the preform mold, the preform mold is descended rapidly right below the nozzle to thereby separate the molten glass flow at the constricted portion by the surface tension of the molten glass. Thus, the required mass of the molten glass gob is received by a receiving member to be molded into the preform.

For manufacturing of a preform having a smooth surface (e.g., a free surface) free of flaws, stains, creases, surface deterioration, or the like, various methods may be used. Examples of such methods include a method of molding the preform while floating the molten glass gob over the preform mold or the like by applying wind pressure to the molten glass gob, and a method of molding the preform by dripping a drop of the molten glass in a liquid medium, such as liquid nitrogen, obtained by cooling a substance which is in a gaseous state at room temperature and at normal pressure.

When the molten glass gob is molded into the preform by floating the molten glass gob, gas (hereafter, referred to as floating gas) is blown to the molten glass gob, whereby the upward wind pressure is applied to the molten glass gob. At this time, if the viscosity of the molten glass gob is too low, the floating gas penetrates into the molten glass and remains in the preform in the form of air bubbles. However, by setting the viscosity of the molten glass gob to be from 3 to 60 dPa·s, the floating gas is prevented from penetrating into the molten glass and allows the glass gob to float.

As gas to be blown to the preform as the floating gas, air, $N_2$ gas, $O_2$ gas, Ar gas, He gas, steam, or the like may be used. The wind pressure is not limited to a particular range as long as it allows the preform to float without contacting a solid matter, such as a surface of the mold.

Since molded products (e.g., optical elements) such as lenses obtained by precise press molding from preforms often have rotationally symmetric axes, preferably, these preforms also have shapes with rotationally symmetric axes. For example, such a preform has a spherical shape or a shape with a single rotationally symmetric axis. Examples of a shape having a single rotationally symmetric axis include a shape whose cross section including the rotationally symmetric axis has a smooth contour line free of edges and recesses, such as the one with the cross section having an elliptical contour in which the shorter axis coincides with the rotationally asymmetric axis, or a shape obtained by flattening a sphere (i.e., a shape obtained by defining a single rotationally symmetric axis passing through the center of a sphere and by contracting the sphere in the axis direction).

In the preform manufacturing method I, the glass is molded in such a temperature range that allows plastic deformation. Accordingly, the glass gob may be press-molded in order to manufacture the preform. In this case, since the shape of the preform may be configured relatively freely, any shape close to a targeted shape of the optical element may be obtained. For example, in two opposing surfaces of the preform, one surface may have a convex shape, and the other surface may have a concave shape, or both the surfaces may have a concave shape. Alternatively, one surface may be flat, and the other surface may have a convex shape, or one surface may be flat, and the other surface may have a concave shape. Or, both the surfaces may have a convex shape.

In the preform manufacturing method II, for example, the molten glass is cast into a die for molding, and the resulting molded body then undergoes annealing to reduce strain. Then, the molded body is cut or split into a plurality of glass pieces each having a predetermined size and shape, and each glass piece is polished to smoothen its surface to form a preform configured by a predetermined mass of the glass. Preferably, the surface of thus manufactured preform is also covered with a carbon-containing film. The preform manufacturing method II is suited for manufacturing of, for example, spherical and planar preforms that may be ground and polished without difficulty.

Since the optical glass used has excellent thermal stability in both the manufacturing methods, these methods are less likely to produce defective products due to devitrification, striae, or the like of the glass. Accordingly, high quality preforms are manufactured in a reliable manner, and mass productivity of the manufacturing processes of the optical element as a whole is improved.

Preforms that are more preferred from the perspective of even further improving the mass productivity of the optical element using precision press molding are described as follows.

Although the optical glass of the present invention affords excellent precision press moldability in terms of the glass material, reducing the magnitude of deformation of the glass during the precision press molding offers still further possibilities of reduction in temperature of the glass and the mold during the precision press molding, reduction in time required for the press molding, and reduction in the pressing pressure. These result in a decrease in reactivity between the glass and the molding surface of the mold, thus further reducing the aforementioned defective and further improving the mass productivity.

For precision press molding of a lens, preferably, a preform having two pressed surfaces facing to opposite directions (which are pressed by molding surfaces of molds that oppose to each other during the precision press molding) is used. More preferably, a preform having a rotationally symmetric axis passing through the center of the two pressed surfaces is used. Among many such preforms, the one having one of the pressed surfaces in the form of a convex surface and the other one of the pressed surfaces in the form of a concave surface, a flat surface, or a convex surface of lower curvature than the one of the pressed surfaces is preferably used in precision press molding of a meniscus lens.

A preform having one of the pressed surfaces in the form of a convex, a concave, or a flat surface and the other one of the pressed surfaces in the form of a convex, a concave, or a flat surface is preferably used in precision press molding of a biconcave lens.

A preform having one of the pressed surfaces in the form of a convex surface and the other one of the pressed surfaces in the form of a convex or a flat surface is preferably used in precision press molding of a biconvex lens.

In any cases, a preform having a shape that is closer to the shape of the precision press-molded product is more preferred.

When the molten glass gob is molded into a preform with use of a preform mold, the lower surface of the glass located on the mold is generally determined by the shape of the molding surface of the mold. On the other hand, the shape of the upper surface of the glass is determined by surface tension of the molten glass and the weight of the glass itself. In order to reduce the magnitude of deformation of the glass during the precision press molding, the shape of the upper surface of the glass also needs to be regulated while the glass is being molded in the preform mold. The shape of the upper surface of the glass, which is determined by the surface tension of the molten glass and the weight of the glass itself, tends to be a free convex surface. In order to make the upper surface a flat surface, a concave surface, or a convex surface of less curvature than the free surface, it may be necessary to apply pressure to the upper surface of the glass. For example, a mold having a molding surface of a desired shape may be pressed against the upper surface of the glass, or wind pressure may be applied to the upper surface of the glass, to mold the glass into the desired shape. When the mold is pressed against the upper surface of the glass, a plurality of gas ports may be formed in the molding surface of the mold. Gas may be ejected through these ports to form a gas cushion between the molding surface and the upper surface of the glass, and the upper surface of the glass may be molded via the gas cushion. Alternatively, in order to mold the upper surface of the glass into a surface of greater curvature than the aforementioned free surface, negative pressure may be generated in the vicinity of the upper surface of the glass to produce a bulge on the upper surface.

Additionally, to obtain a preform having a shape that is closer to the shape of the precision press-molded product, a polished preform is preferred. For example, it is preferable to use a preform having one of the pressed surfaces that has been polished into a flat surface or a part of a spherical surface, and the other one of the pressed surfaces that has been polished into a part of the spherical surface or a flat surface. The part of the spherical surface may be convex or concave, and whether it is made convex or concave is preferably determined depending on the shape of the precision press-molded product as described above.

The various preforms described above are preferably used for molding of lenses having diameters of 10 mm or more and more preferably used for molding of lenses having diameters of 20 mm or more. These preforms are also preferably used for molding of lenses having center thicknesses greater than 2 mm.

(Optical Element)

A preferred optical glass of the present invention will be described below in detail.

An optical element of the present invention is configured by using the optical glass of the present invention.

The optical element is not limited to a particular type. Typical examples of the optical element include an aspherical lens, a spherical lens, a plano-concave lens, a plano-convex lens, a biconcave lens, a biconvex lens, a convex meniscus lens, a concave meniscus lens, a microlens, a lens array, a lens with a diffraction grating, a prism, and a prism with a lens function. Preferred examples of the optical element include a convex meniscus lens, a concave meniscus lens, a biconvex lens, a biconcave lens, a plano-convex lens, a plano-concave lens, a prism, and a diffraction grating. These lenses may be aspherical or spherical. As needed, antireflective films, partially reflective films with wavelength selectivity, and the like may be disposed on the surfaces of the lenses.

<Manufacturing Method of Optical Element>

Next, a description is given of a manufacturing method of an optical element of the present invention.

The optical element of the present invention may be manufactured by precision press-molding a preform of the present invention as described above with use of a press mold.

In a preferred embodiment of the manufacturing method of the optical element according to the present invention, the preform of the present invention as described above is repeatedly precision press-molded with use of a single press mold, and thus, the optical element is manufactured in large quantities.

To prevent oxidation of the molding surface of the press mold or the mold releasing film disposed on the molding surface, the processes of heating the press mold and the preform and precision press molding are preferably conducted in a nonoxidizing gas atmosphere, such as nitrogen gas or a mixture of nitrogen gas and hydrogen gas. In a nonoxidizing gas atmosphere, the carbon-containing film covering the preform surface does not oxidize, and this film remains on the surface of the molded product resulting from the precision press molding. This film must be removed in the end. The carbon-containing film may be removed relatively easily and completely, simply by heating the precision press-molded product in an oxidizing atmosphere, such as the atmosphere. The oxidation and removal of the carbon-containing film must be conducted at such a temperature that does not cause deformation of the precision press-molded product by the heating. In particular, the oxidation and removal of the carbon-containing film are preferably conducted within a temperature range less than the glass transformation temperature.

Press molds used in precision press molding have molding surfaces which have been processed into desired shapes with high precision. To prevent glass from fusing to the molding surfaces during pressing, mold releasing films may be formed on the molding surfaces. Examples of such a mold releasing film include a carbon-containing film, a nitride film, and a noble metal film. As the carbon-containing film, a hydrogenated carbon film or carbon film are preferred.

The manufacturing method of the optical element includes the following two embodiments.

In a first embodiment (hereinafter referred to as an optical element manufacturing method I), a preform is introduced into a press mold, the preform and press mold are heated together, and precision press molding is conducted. In a second embodiment (hereinafter referred to as an optical element manufacturing method II), a preform, after being heated, is introduced into a preheated press mold, and precision press molding is conducted.

In the optical element manufacturing method I, the preform is positioned between an opposing pair of molds, which consists of an upper mold and a lower mold each having a molding surface that has been processed into a precise shape. Subsequently, the mold and preform are both heated to a temperature corresponding to a glass viscosity of $10^5$ to $10^9$ dPa·s to soften the preform, and the preform is press-molded to precisely transfer the molding surface of the mold to the glass. The optical element manufacturing method I is preferred when improvement in molding precision, such as surface precision and eccentricity precision, is regarded as of major importance.

In the optical element manufacturing method II, a preform is preheated to a temperature corresponding to a glass viscosity of $10^4$ to $10^8$ dPa·s, and the preheated preform is positioned between an opposing pair of molds, which consists of an upper mold and a lower mold each having a molding surface that has been processed into a precise shape. Then, the preform is press-molded to precisely transfer the molding surface of the mold to the glass. The optical element manufacturing method II is preferred when improvement in productivity is regarded as of major importance.

The pressure and duration of the pressing may be appropriately determined in light of the glass viscosity or the like. For example, the pressing pressure may be about 5 to 15 MPa, and the duration may be 10 to 300 seconds. Pressing conditions such as the pressing duration and the pressing pressure may be appropriately determined within well-known ranges in accordance with the shape and dimension of the molded product.

Subsequently, the molds and precision press-molded product are cooled, and preferably at a temperature below the strain point, the molds are released to take out the precision press-molded product. During the cooling, annealing conditions of the molded product, such as the annealing rate, may be appropriately adjusted to precisely achieve desired values of the optical characteristics.

Additionally, the optical element of the present invention may be manufactured without employing a press molding step. For example, homogeneous molten glass may be cast into a die to form a glass block. The resulting glass block then undergoes annealing to reduce strain. The annealing conditions may be adjusted to achieve a desired glass refractive index value and adjust the optical characteristics. Subsequently, the glass block may be cut or split into glass pieces, which are each ground and polished to form a final optical element.

Examples

Optical glasses of the present invention will be described in greater detail below through Examples and Comparative Examples. However, the present invention is not limited to these Examples.

As materials for optical glasses, the corresponding oxides, hydroxides, carbonates, phosphates, or the like were vitrified. The vitrified materials were then weighed at 100 g, fully mixed, and loaded into a platinum crucible and heated for 1 to 2 hours in an electric furnace at 1200 to 1500° C. Subsequently, the molten products were stirred timely to be homogenized and were refined, followed by casting into a mold that is preheated to an appropriate temperature. The resulting products were gradually cooled in the electric furnace to remove strain. Thus, the optical glasses of Examples 1 to 21 and Comparative Examples 1 to 14 were obtained. For each of the obtained optical glasses, the specific gravity, the chemical durability (water resistance), the refractive index (nd), the Abbe number (vd), the glass transformation temperature (Tg), and the yield point (At) were measured. Furthermore, the fusibility was evaluated.

(i) The specific gravity, (ii) the chemical durability (water resistance), (iii) the refractive index (nd) and the Abbe number (vd), and (iv) the glass transformation temperature (Tg) and the yield point (At) were respectively measured by the methods prescribed in (i) "JOGIS05-1975 Measuring Method for Specific Gravity of Optical Glass", (ii) "JOGIS06-2009 Measuring Method for Chemical Durability of Optical Glass (Powder Method)", (iii) "JOGIS01-2003 Measuring Method for Refractive Index of Optical Glass", and (iv) "JOGIS08-2003 Measuring Method for Thermal Expansion of Optical Glass" according to the Japan Optical Glass Industrial Standards. The result of the measurement is shown through Tables 1 to 5.

Furthermore, the fusibility was evaluated according to the following evaluation method and standard. The result of the evaluation is shown through Tables 1 to 5.

<Evaluation Method of Fusibility>

The materials were loaded and then heated for 30 minutes in an electric furnace at 1400° C. The glasses, unstirred, were taken out from the electric furnace and checked for the presence of unmelted portions in the glasses.

<Evaluation Standard of Fusibility>

○: Unmelted portion was not observed.

x: Unmelted portion was observed.

TABLE 1

| Composition (% by mass) | Ex. 1 | Ex. 2 | Ex. 3 | Ex. 4 | Ex. 5 | Ex. 6 | Ex. 7 |
| --- | --- | --- | --- | --- | --- | --- | --- |
| $SiO_2$ | 37 | 48 | 46 | 36 | 45 | 43 | 42 |
| $B_2O_3$ | 18 | 15 | 14 | 23 | 21 | 20 | 23 |
| $Al_2O_3$ | 15 | 9 | 13 | 8 | 7 | 10 | 14 |
| $Li_2O$ | 9 | 10 | 9 | 10 | 8 | 10 | 6 |
| MgO | | | | | | | |
| CaO | 15 | 13 | 12 | 17 | 14 | 17 | 15 |

TABLE 1-continued

| Composition (% by mass) | Ex. 1 | Ex. 2 | Ex. 3 | Ex. 4 | Ex. 5 | Ex. 6 | Ex. 7 |
|---|---|---|---|---|---|---|---|
| $ZrO_2$ | 3 | | 4 | 2 | 5 | | |
| $La_2O_3$ | 3 | 5 | 2 | 4 | | | |
| ZnO | | | | | | | |
| $TiO_2$ | | | | | | | |
| $Nb_2O_5$ | | | | | | | |
| $Ta_2O_5$ | | | | | | | |
| nd | 1.59381 | 1.58641 | 1.58575 | 1.59671 | 1.59055 | 1.58189 | 1.57471 |
| vd | 58.4 | 59.3 | 58.6 | 59.2 | 58.5 | 60.2 | 61.0 |
| Tg | 520 | 511 | 525 | 513 | 529 | 501 | 534 |
| At | 559 | 553 | 567 | 550 | 570 | 542 | 582 |
| Specific gravity | 2.67 | 2.64 | 2.63 | 2.67 | 2.63 | 2.59 | 2.57 |
| Chemical durability (water resistance) RW | 2 | 1 | 1 | 1 | 2 | 2 | 2 |
| Fusibility | ○ | ○ | ○ | ○ | ○ | ○ | ○ |

TABLE 2

| Composition (% by mass) | Ex. 8 | Ex. 9 | Ex. 10 | Ex. 11 | Ex. 12 | Ex. 13 | Ex. 14 |
|---|---|---|---|---|---|---|---|
| $SiO_2$ | 47 | 52 | 40 | 45 | 43 | 42 | 45 |
| $B_2O_3$ | 19 | 20 | 17 | 18 | 18 | 19 | 18 |
| $Al_2O_3$ | 10 | 9 | 11 | 12 | 10 | 9 | 10 |
| $Li_2O$ | 11 | 10 | 10 | 9 | 11 | 9 | 9 |
| MgO | | | | | | 5 | |
| CaO | 9 | 6 | 16 | 16 | 15 | 14 | 15 |
| $ZrO_2$ | | 3 | 1 | | 1 | 1 | |
| $La_2O_3$ | 4 | | 5 | | 2 | 1 | |
| ZnO | | | | | | | 3 |
| $TiO_2$ | | | | | | | |
| $Nb_2O_5$ | | | | | | | |
| $Ta_2O_5$ | | | | | | | |
| nd | 1.57504 | 1.57233 | 1.58922 | 1.57399 | 1.58883 | 1.58911 | 1.58636 |
| vd | 60.7 | 60.5 | 59.1 | 61.9 | 59.0 | 58.8 | 59.5 |
| Tg | 502 | 504 | 513 | 505 | 499 | 511 | 514 |
| At | 537 | 544 | 551 | 544 | 536 | 552 | 552 |
| Specific gravity | 2.57 | 2.52 | 2.65 | 2.56 | 2.61 | 2.62 | 2.61 |
| Chemical durability (water resistance) RW | 2 | 1 | 1 | 2 | 2 | 2 | 2 |
| Fusibility | ○ | ○ | ○ | ○ | ○ | ○ | ○ |

TABLE 3

| Composition (% by mass) | Ex. 15 | Ex. 16 | Ex. 17 | Ex. 18 | Ex. 19 | Ex. 20 | Ex. 21 |
|---|---|---|---|---|---|---|---|
| $SiO_2$ | 45 | 38 | 45 | 44 | 40 | 36 | 40 |
| $B_2O_3$ | 20 | 25 | 21 | 19 | 19 | 23 | 25 |
| $Al_2O_3$ | 14 | 12 | 10 | 15 | 9 | 7 | 11 |
| $Li_2O$ | 9 | 7 | 11 | 8 | 9 | 10 | 10 |
| MgO | | | | | | | |
| CaO | 9 | 15 | 10 | 14 | 15 | 16 | 7 |
| $ZrO_2$ | | | | | 4 | 1 | 5 |
| $La_2O_3$ | | | | | 4 | 7 | |
| ZnO | | | | | | | |
| $TiO_2$ | 3 | | | | | | |
| $Nb_2O_5$ | | 3 | | | | | 1 |
| $Ta_2O_5$ | | | 3 | | | | 1 |
| nd | 1.58617 | 1.59009 | 1.57748 | 1.57681 | 1.59549 | 1.60401 | 1.58271 |
| vd | 582 | 58.1 | 60.3 | 61.4 | 58.7 | 58.2 | 59.1 |
| Tg | 512 | 530 | 494 | 513 | 529 | 518 | 513 |
| At | 549 | 579 | 533 | 550 | 570 | 557 | 550 |
| Specific gravity | 2.53 | 2.61 | 2.56 | 2.58 | 2.68 | 2.73 | 2.58 |
| Chemical durability (water resistance) RW | 1 | 2 | 2 | 2 | 1 | 1 | 1 |
| Fusibility | ○ | ○ | ○ | ○ | ○ | ○ | ○ |

TABLE 4

| Composition (% by mass) | Com. Ex. 1 | Com. Ex. 2 | Com. Ex. 3 | Com. Ex. 4 | Com. Ex. 5 | Com. Ex. 6 | Com. Ex. 7 |
|---|---|---|---|---|---|---|---|
| $SiO_2$ | 48 | 37 | 50 | 35 | 52 | 40 | 39 |
| $B_2O_3$ | 18 | 18 | 19 | 24 | 20 | 13 | 16 |
| $Al_2O_3$ | 4 | 18 | 8 | 6 | 12 | 10 | 7 |
| $Li_2O$ | 10 | 6 | 3 | 15 | 10 | 10 | 7 |
| MgO | | | | | | | |
| CaO | 17 | 15 | 17 | 17 | 3 | 27 | 27 |
| SrO | | | | | | | |
| BaO | | | | | | | 4 |
| $ZrO_2$ | 3 | 3 | 3 | | | | |
| $La_2O_3$ | | 3 | | 3 | 3 | | |
| ZnO | | | | | | | |
| $TiO_2$ | | | | | | | |
| $Nb_2O_5$ | | | | | | | |
| $Ta_2O_5$ | | | | | | | |
| nd | 1.58707 | 1.58586 | 1.57393 | 1.59392 | 1.55580 | 1.60019 | 1.58952 |
| vd | 59.4 | 59.3 | 61.8 | 58.9 | 61.1 | 57.9 | 60.0 |
| Tg | 472 | 540 | 565 | 467 | 512 | 486 | 503 |
| At | 512 | 585 | 616 | 502 | 553 | 531 | 539 |
| Specific gravity | 2.61 | 2.63 | 2.59 | 2.62 | 2.52 | 2.66 | 2.88 |
| Chemical durability (water resistance) RW | 3 | 1 | 2 | 4 | 1 | 3 | 1 |
| Fusibilty | ○ | x | ○ | ○ | ○ | ○ | ○ |

TABLE 5

| Composition (% by mass) | Com. Ex. 8 | Com. Ex. 9 | Com. Ex. 10 | Com. Ex. 11 | Com. Ex. 12 | Com. Ex. 13 | Com. Ex. 14 |
|---|---|---|---|---|---|---|---|
| $SiO_2$ | 42 | 39 | 42 | 33 | 57 | 54 | 42 |
| $B_2O_3$ | 16 | 16 | 16 | 26 | 13 | 9 | 29 |
| $Al_2O_3$ | 9 | 7 | 9 | 13 | 7 | 14 | 7 |
| $Li_2O$ | 8 | 7 | 8 | 10 | 9 | 10 | 7 |
| MgO | | | | | | | |
| CaO | | 10 | 10 | 16 | 14 | 13 | 13 |
| SrO | | 17 | | | | | |
| BaO | 25 | | 15 | | | | |
| $ZrO_2$ | | 4 | | 2 | | | |
| $La_2O_3$ | | | | | | | 2 |
| ZnO | | | | | | | |
| $TiO_2$ | | | | | | | |
| $Nb_2O_5$ | | | | | | | |
| $Ta_2O_5$ | | | | | | | |
| nd | 1.58610 | 1.60166 | 1.58956 | 1.58870 | 1.57053 | 1.56894 | 1.57170 |
| vd | 60.2 | 58.1 | 59.9 | 59.8 | 61.0 | 59.7 | 61.7 |
| Tg | 491 | 543 | 516 | 498 | 505 | 494 | 530 |
| At | 529 | 583 | 554 | 541 | 550 | 540 | 569 |
| Specific gravity | 2.89 | 2.89 | 2.81 | 2.63 | 2.58 | 2.56 | 2.58 |
| Chemical durability (water resistance) RW | 2 | 1 | 2 | 3 | 1 | 1 | 4 |
| Fusibility | ○ | ○ | ○ | ○ | x | x | ○ |

As shown in Tables 1 to 3, the optical glasses of Examples 1 to 21 obtained according to the present invention all satisfy the specific gravity, the chemical durability (water resistance), the refractive index (nd), the Abbe number (vd), glass transformation temperature (Tg), and yield point (At) which are targeted by the present invention.

In contrast, the optical glasses of Comparative Examples 1 to 14 shown in Tables 4 and 5 do not satisfy the target in the following points.

The optical glass of Comparative Example 1 has a low content of $Al_2O_3$, and accordingly, has a low chemical durability (water resistance).

The optical glass of Comparative Example 2 has a high content of $Al_2O_3$, and accordingly, has low fusibility.

The optical glass of Comparative Example 3 has a low content of $Li_2O$, and accordingly, has high glass transformation temperature (Tg) and yield point (At).

The optical glass of Comparative Example 4 has a high content of $Li_2O$, and accordingly, has a low chemical durability (water resistance).

The optical glass of Comparative Example 5 has a low content of CaO, and accordingly, has a low refractive index (nd).

The optical glass of Comparative Example 6 has a high content of CaO, and accordingly, has a low chemical durability (water resistance).

The optical glass of Comparative Examples 7 and 9 contain SrO, and accordingly, has a high specific gravity.

The optical glass of Comparative Examples 8 and 10 contain BaO, and accordingly, has a high specific gravity.

The optical glass of Comparative Example 11 has a low content of $SiO_2$, and accordingly, has a low chemical durability (water resistance).

The optical glass of Comparative Example 12 has a high content of $SiO_2$, and accordingly, has low fusibility.

The optical glass of Comparative Example 13 has a low content of $B_2O_3$, and accordingly, has low fusibility and refractive index.

The optical glass of Comparative Example 14 has a high content of $B_2O_3$, and accordingly, has a low chemical durability (water resistance).

The invention claimed is:

1. An optical glass having a refractive index (nd) of 1.575 to 1.605 and an Abbe number (vd) of 58 to 62, comprising a composition including,
in % by mass,
$SiO_2$ in an amount of 35 to 55%,
$B_2O_3$ in an amount of 12 to 27%,
$Al_2O_3$ in an amount of 6 to 16%,
$Li_2O$ in an amount of 5 to 12%,
MgO in an amount of 0 to 10%,
CaO in an amount of 5 to 17%,
$ZrO_2$ in an amount of 0 to 7%,
$La_2O_3$ in an amount of 0 to 7%,
ZnO in an amount of 0 to 5%,
$TiO_2$ in an amount of 0 to 5%,
$Nb_2O_5$ in an amount of 0 to 5%, and
$Ta_2O_5$ in an amount of 0 to 5%, wherein
SrO and BaO are not included.

2. The optical glass of claim 1, comprising a specific gravity of less than 2.80.

3. The optical glass of claim 1, comprising a chemical durability (water resistance) of Class 1 to Class 2 according to a powder method specified in the Japan Optical Glass Industrial Standards (JOGIS).

4. The optical glass of claim 1, comprising a glass transformation temperature (Tg) of 545° C. or less and a yield point (At) of 590° C. or less.

5. A preform for precision press molding, comprising the optical glass of claim 1 as a material thereof.

6. An optical element, comprising the optical glass of claim 1 as a material thereof.

* * * * *